Feb. 12, 1924.
G. W. SYKES
1,483,697
AUTOMOBILE CURTAIN CONTAINER
Filed Oct. 17, 1921
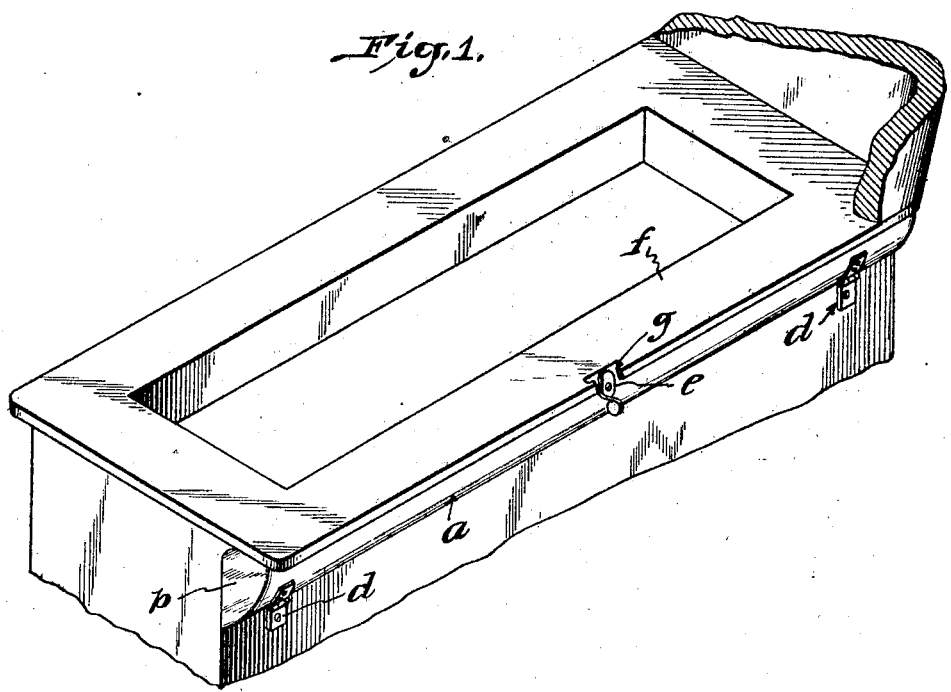
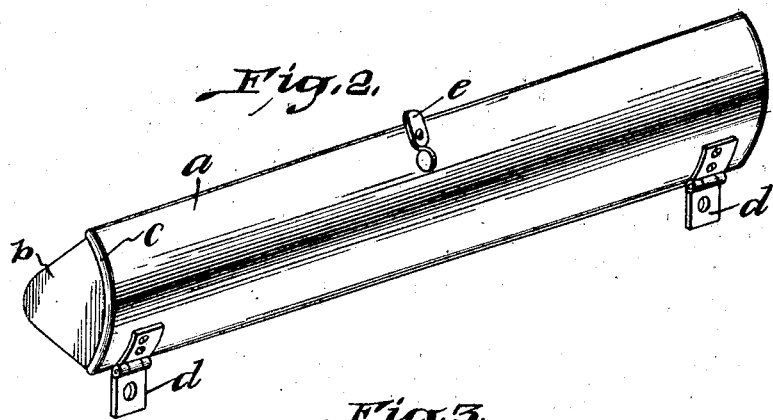
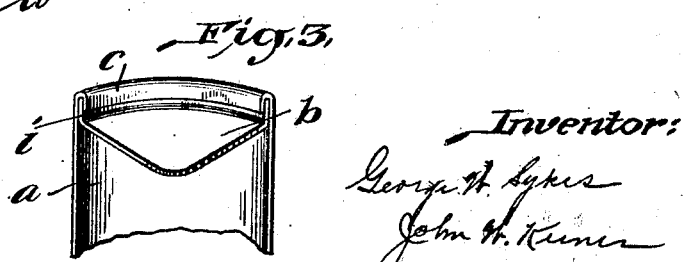
Inventor:
George W. Sykes
John H. Kuner
by
atty.

Patented Feb. 12, 1924.

1,483,697

UNITED STATES PATENT OFFICE.

GEORGE W. SYKES, OF VANCOUVER, WASHINGTON.

AUTOMOBILE-CURTAIN CONTAINER.

Application filed October 17, 1921. Serial No. 508,111.

*To all whom it may concern:*

Be it known that I, GEORGE W. SYKES, a citizen of the United States of America, and a resident of the city of Vancouver, in the county of Clarke and State of Washington, have invented a certain new and useful Improvement in Automobile-Curtain Containers to be Attached to the Seat of Automobiles, of which the following is a clear and complete description, reference being had to the accompanying drawing, which forms a part of my specification.

My invention relates to a container or receptacle which is more especially intended for use in carrying the curtains of an automobile in a rolled state. One object is to provide a more simple, convenient, and out-of-the-way container for carrying and storing curtains of an automobile when detached therefrom, in a rolled state instead of folding the same, which if continued results in cracking the curtains, and also obviates the placing of the curtains under the seat of an automobile.

A further object of my invention is to provide a container or receptacle that may be used to carry in addition to the rolled curtains, dust cloths and other necessary paraphernalia, and if desired separate sub-compartments may be provided by the insertion of partitions.

Another object of the device is to provide a container of such a character of less parts and more simple in operation, and constructed at less expense than other similar devices heretofore patented, which is accomplished by utilizing a portion of the automobile seat as part of the container.

This container is preferably intended to be constructed of suitable sheet metal, but may be made of any appropriate material, and of such dimensions that it will fit the seat of the automobile to which attached, preferably the rear of the front seat of an automobile.

Further objects of the invention as well as the advantages thereof will be more fully comprehended from the following detailed description of the accompanying drawings wherein—

Figure 1 is a fragmental detail of an automobile seat with the device applied thereto.

Fig. 2 is a perspective view of the device.

Fig. 3 is a detail section showing method of attaching the end pieces.

In its specific embodiment, the invention comprises a sheet metal sector shaped casing "$a$", Figs. 1, 2 and 3, shown as a longitudinal section of a cylinder in any suitable size, which in combination with the rear portion of the seat "$f$" of an automobile, and two quadrant shaped end pieces or plates "$b$" form a long container or receptacle. Both ends of casing "$a$" are beaded over at "$c$" to hold and secure end pieces "$b$", best shown in Fig. 3, by means of the flanged portion "$i$" of end pieces "$b$" integral therewith. It is entirely feasible to cast or stamp casing "$a$" with end pieces "$b$" integral therewith. The rounded lower portion of casing "$a$" forms the bottom of the container, and a portion of the seat "$f$" of the automobile constitutes the rear wall of said container. To casing "$a$" are attached hinges "$d$" by appropriate bolts or screws. Casing "$a$" also has attached to it a suitable catch "$e$", Figs. 1 and 2, which catch "$e$" when the device is raised is manually operated to lock the device by fitting snugly into specially prepared slot "$g$" cut into the rear of automobile seat "$f$". It will be noted that the device as an article of manufacture practically consists of three pieces, i. e. sector shaped casing "$a$" and two quadrant shaped end pieces "$b$" which in combination with a portion of automobile seat "$f$" forms a very convenient container or receptacle to store the curtains of an automobile in a rolled state and may also be used for carrying other articles. The device may be of any suitable form and dimensions, but it is believed the construction shown is preferable, being adapted to fit on the rear of the front seat of an automobile. With this improved device the automobilist may quickly open the receptacle and take out the rolled curtains without raising the front seat cushion which is the usual storage place for curtains.

In operation the hinged casing "$a$" is manually opened by taking hold of catch "$e$" and pulling down, and the device is closed by raising casing "$a$" and locking it by means of catch "$e$", turning same into slot "$g$" provided on the rear of seat "$f$". Separate compartments may be provided by using appropriate partitions, thereby providing storage space for other articles in addition to curtains.

I am aware that prior to my invention containers and receptacles have been made somewhat similar to my invention, but not with the few simple parts, or with the ultilization of a portion of another useful object as a part thereof, nor with the economical constructions of my device, therefore I do not claim such a device broadly, but having described my invention, what I claim is:—

1. In combination for the purpose of forming a receptacle, the back of a seat of an automobile, a casing, comprising a longitudinal portion of a cylinder hingedly attached at lower edge of said casing and to said seat and two flanged quadrant shaped end pieces, the ends of said cylinder being beaded over the flanged portions of said end pieces, hinge means attached to the lower edge of said casing and the back portion of the seat, a slot provided on said seat, and fastening means carried by said casing fitting into said slot, substantially as described.

2. In combination to form a receptacle, the upper back portion of a seat of an automobile, a curved casing, comprising a longitudinal portion of a hollow cylinder attached at lower edge thereof to said seat by hinge means and two quadrant shaped end pieces, each end piece being provided with a flanged portion integral therewith over which is beaded the respective ends of said cylinder, hinge means attached to lower edge of said casing and to the seat, a slot provided on said seat to receive a catch, a movable catch attached to said casing to fit snugly into said slot, capable of being locked and unlocked by manually turning the catch, substantially as and for the purpose described.

In testimony whereof, I have hereunto signed my name in the presence of two witnesses.

GEORGE W. SYKES.

Witnesses:
H. MARTIN,
GEO. E. WALTER.